(12) United States Patent
Bailey et al.

(10) Patent No.: US 8,443,163 B1
(45) Date of Patent: May 14, 2013

(54) METHODS, SYSTEMS, AND COMPUTER READABLE MEDIUM FOR TIER-BASED DATA STORAGE RESOURCE ALLOCATION AND DATA RELOCATION IN A DATA STORAGE ARRAY

(75) Inventors: Charles Christopher Bailey, Durham, NC (US); Prabu Surendra, Vellore (IN); Miles Aram de Forest, Bahama, NC (US); David Haase, Fuquay Varina, NC (US); Samuel Mullis, Raleigh, NC (US); Dean Herington, Hillsborough, NC (US)

(73) Assignee: EMC Corporation, Hopkinton, MA (US)

( * ) Notice: Subject to any disclaimer, the term of this patent is extended or adjusted under 35 U.S.C. 154(b) by 383 days.

(21) Appl. No.: 12/824,816

(22) Filed: Jun. 28, 2010

(51) Int. Cl.
*G06F 12/00* (2006.01)
(52) U.S. Cl.
USPC ........... 711/170; 711/114; 711/156; 711/165; 711/173
(58) Field of Classification Search ........................ None
See application file for complete search history.

(56) References Cited

U.S. PATENT DOCUMENTS

| | | | |
|---|---|---|---|
| 5,604,902 A | 2/1997 | Burkes et al. | |
| 6,681,242 B1 | 1/2004 | Kumar et al. | |
| 6,880,062 B1 | 4/2005 | Ibrahim et al. | |
| 7,284,244 B1 | 10/2007 | Sankaranarayan et al. | |
| 7,340,522 B1 | 3/2008 | Basu et al. | |
| 7,406,484 B1 | 7/2008 | Srinivasan et al. | |
| 7,463,648 B1 * | 12/2008 | Eppstein et al. | 370/468 |
| 7,480,912 B2 | 1/2009 | Arnold et al. | |
| 7,849,180 B2 | 12/2010 | Sawyer et al. | |
| 2001/0049779 A1 | 12/2001 | Shimada et al. | |
| 2003/0056073 A1 | 3/2003 | Zeiger | |
| 2003/0131165 A1 | 7/2003 | Asano et al. | |
| 2004/0039891 A1 | 2/2004 | Leung et al. | |
| 2004/0098537 A1 | 5/2004 | Serizawa | |
| 2004/0153606 A1 | 8/2004 | Schott | |
| 2004/0181476 A1 | 9/2004 | Smith et al. | |
| 2004/0243699 A1 | 12/2004 | Koclanes et al. | |
| 2005/0273556 A1 | 12/2005 | Gellai et al. | |
| 2006/0085471 A1 | 4/2006 | Rajan et al. | |
| 2006/0112247 A1 | 5/2006 | Ramany et al. | |
| 2006/0143424 A1 | 6/2006 | Matsuzaki | |
| 2007/0043842 A1 | 2/2007 | Chouanard et al. | |

(Continued)

OTHER PUBLICATIONS

Official Action for U.S. Appl. No. 12/164,959 (Sep. 12, 2011).

(Continued)

*Primary Examiner* — Shawn X Gu
(74) *Attorney, Agent, or Firm* — Jenkins, Wilson, Taylor & Hunt, P.A.

(57) ABSTRACT

According to one aspect, the subject matter described herein includes a method for tier-based slice allocation and data relocation in a data storage array. The method is performed at a data storage array including physical data storage capacity being logically divided into one or more logical units (LUs) and each of the one or more LUs being further subdivided into one or more slices, where the data storage array includes a resource pool being divided into a plurality of resource groupings, where each resource grouping includes one or more resources of a common type. The method includes receiving a slice allocation request for allocating a slice from the data storage array, where the slice allocation request includes at least one constraint. In response to receiving the slice allocation request, a slice that honors the at least one constraint is allocated.

41 Claims, 8 Drawing Sheets

U.S. PATENT DOCUMENTS

| | | | |
|---|---|---|---|
| 2007/0143563 | A1 | 6/2007 | Pudipeddi et al. |
| 2007/0185934 | A1 | 8/2007 | Cannon et al. |
| 2008/0082593 | A1 | 4/2008 | Komarov et al. |
| 2009/0064159 | A1 | 3/2009 | LaFrese et al. |
| 2009/0077327 | A1 | 3/2009 | Hara |
| 2009/0089516 | A1 | 4/2009 | Pelts et al. |
| 2009/0276588 | A1 | 11/2009 | Murase |
| 2010/0153641 | A1 | 6/2010 | Jagadish et al. |
| 2010/0262802 | A1 | 10/2010 | Goebel et al. |
| 2010/0299495 | A1 | 11/2010 | Frank |
| 2011/0191536 | A1 | 8/2011 | Mizuno et al. |

OTHER PUBLICATIONS

Commonly Assigned, Co-pending U.S. Appl. No. 13/168,329 for "Methods, Systems and Computer Readable Medium for Controlling Prioritization of Tiering and Spin Down Features in a Data Storage System" (filed Jun. 24, 2011).

Final Official Action for U.S. Appl. No. 12/100,514 (May 25, 2011).

Non-Final Official Action for U.S. Appl. No. 12/100,514 (Nov. 16, 2010).

Commonly-assigned, Co-pending U.S. Appl. No. 12/826,434 for "Managing Multi-Tiered Storage Pool Provisioning," (filed Jun. 29, 2010).

Commonly Assigned, Co-pending U.S. Appl. No. 12/826,385 for "Systems, Methods, and Computer Readable Media for Compressing Data at a Virtually Provisioned Storage Entity" (filed Jun. 29, 2010).

Commonly Assigned, Co-pending U.S. Appl. No. 12/751,685 for "Systems, Methods, and Computer Readable Media for an Adaptive Block Allocation Mechanism" (filed Mar. 31, 2010).

Commonly Assigned, Co-pending U.S. Appl. No. 12/164,959 for "Methods, Systems, and Computer Readable Medium for Dynamic, Policy-Based Allocation of System Resources" (filed, Jun. 30, 2008).

Commonly Assigned, Co-pending U.S. Appl. No. 12/100,514 for "Methods, Systems, and Computer Readable Medium for Allocation Physical Storage in a Storage Array" (filed, Apr. 10, 2008).

Final Official Action for U.S. Appl. No. 12/751,685 (Jun. 27, 2012).

Applicant-Initiated Interview Summary for U.S. Appl. No. 12/100,514 (Jun. 5, 2012).

Non-Final Official Action for U.S. Appl. No. 12/751,665 (May 8, 2012).

Non-Final Official Action for U.S. Appl. No. 12/751,685 (Feb. 14, 2012).

Non-Final Official Action for U.S. Appl. No. 12/100,514 (Jan. 31, 2012).

Notice of Allowance and Fee(s) Due for U.S. Appl. No. 12/751,665 (Nov. 16, 2012).

Interview Summary for U.S. Appl. No. 12/751,665 (Aug. 20, 2012).

Final Official Action for U.S. Appl. No. 12/100,514 (Aug. 10, 2012).

Non-Final Official Action for U.S. Appl. No. 12/164,959 (Jul. 24, 2012).

Non-Final Official Action for U.S. Appl. No. 12/826,434 (Jun. 13, 2012).

Notice of Allowance and Fee(s) Due for U.S. Appl. No. 12/164,959 (Jan. 11, 2013).

* cited by examiner

METHODS, SYSTEMS, AND COMPUTER READABLE MEDIUM FOR TIER-BASED DATA STORAGE RESOURCE ALLOCATION AND DATA RELOCATION IN A DATA STORAGE ARRAY

TECHNICAL FIELD

The subject matter described herein relates to the intelligent allocation of finite system resources. More particularly, the subject matter described herein relates to methods, systems, and computer readable medium for tier-based data storage resource allocation and data relocation in a data storage array.

BACKGROUND

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs) for processing input/output (I/O) requests and management-type requests. Data storage resource allocation requests are generally generated from internal requests (i.e., are not received externally to the data storage array). An SP is the controller for, and primary interface to, the storage array.

Storage systems may include one or more disk arrays. Disk arrays may use a variety of storage devices with various characteristics for providing storage. Each storage array may logically operate as a unified storage device. While such organization generally allows for a homogenous view of the storage devices, it is sometime useful to organize the various storage devices into tiers or classes of storage. A tier is generally delineated by differences in at least one of the four following attributes: price, performance, capacity and function. For example, tier 1 storage devices may be comprised of storage media that is very reliable and very fast, such as flash memory. Tier 2 storage devices may be comprised of storage media that are slower than tier 1 media but are very reliable (e.g., a hard disk). For example, tier 2 storage devices may include high performance disks such as 15,000 RPM Fibre Channel (FC) Disks. Tier 3 storage devices may be comprised of comparatively slower and cheaper storage media than either tier 1 or tier 2, such as 7200 RPM serial ATA (SATA) disks.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Thus, to maximize performance of a storage array, the operational load should be more or less evenly distributed across all physical resources, so that each physical resource may operate at its own maximum capacity. Using a disk storage array as an example, bandwidth, and thus performance, is maximized if "all spindles are being accessed at the same time."

Performance of a storage array may also be characterized by the total power consumption of the array. The administrator of a storage array may prefer to operate the array in a manner that minimizes power consumption ("green" mode) rather than maximizes performance ("brown" mode). Operating a large storage array in green mode may not only reduce power consumption of the array itself and its associated costs but also may have indirect benefits associated with the reduction of heat being generated by the array. For example, storage arrays typically are housed in an environmentally-controlled room or site; operating an array in green mode may reduce the heat that the air conditioning system must remove, thus lowering the cost to run the site HVAC system. Furthermore, semiconductor devices age faster in hot environments than in cold environments; a storage device, whether it is a hard disk drive, flash drive, or other, will age faster if it is mounted in a rack such that it is surrounded by other heat-generating storage devices than if it is in the same rack but surrounded by cool (e.g., idle) storage devices. Thus, operating a storage array in green mode may increase the mean time between failure for the devices in the array.

Separate from but intimately related to performance maximization is the problem of underuse of scarce physical resources. Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or volumes.

The problem of underuse arises when, for example, an amount of storage space is allocated to, but not used by, an operating system, program, process, or user. In this scenario, the scarce (and probably expensive) resource—disk storage space, for example—is unused by the entity that requested its allocation and thus unavailable for use by any other entity. In many cases, the unused space cannot be simply given back. For example, a database installation may require many terabytes of storage over the long term even though only a small fraction of that space may be needed when the database is first placed into operation. In short, it is often the case that the large storage space will be eventually needed, but it is not known exactly when the entire space will be needed. In the meantime, the space lies unused and unavailable for any other use as well.

Recognizing that more storage space may be provisioned for operating systems, programs, and users than they may actually use at first, the concept of a sparsely populated or "thin" logical unit (TLU) was developed. Unlike the more traditional "fat" or fully allocated logical unit (FLU), which is created by provisioning and allocating a certain amount of storage area, a TLU is provisioned at creation but is not allocated any physical storage until the storage is actually needed. For example, physical storage space may be allocated to the TLU upon receipt of an I/O write request from a requesting entity, referred to herein as a "host". Upon receipt of the write request from the host, the SP may then determine whether there is enough space already allocated to the TLU to store the data being written, and if not, allocate to the TLU additional storage space.

While thin logical units provide distinct advantages over fully allocated logical units (i.e., where the entire storage space requested is actually allocated and reserved for the exclusive use of the requesting entity), the manner in which the data storage resource (e.g., slices) are allocated across physical disks can have an enormous impact on the performance of the storage array. A slice is a portion of a logical partition of data stored on a physical disk device.

A naïve approach to allocation of storage for sparsely populated logical units, i.e., one that does not take into consideration the underlying physical and temporal constraints of the storage array in general and of the FLU pool in particular, may fail to meet the goals of the policy, such as green or brown for example, chosen by the administrator of the storage array. For example, if the administrator desires to maximize performance—i.e., a brown policy—a storage processor using a naïve allocation method might allocate all of the slices from a single physical disk, in which case the performance of the entire array may be needlessly constrained by the single disk and thus fail to meet the performance goals of the brown policy.

Systems that manage large numbers or amounts of resources often must impose organizational structures onto the collection of resources in order to manage the collection in a rational way. Preferably, the organization is along natural boundaries that consider real, physical characteristics and constraints of the collection and its individual components. The difficulties of managing large and complex collections of resources may be mitigated via the use of high level abstractions to represent, in simplified form, certain aspects of the system, the collections or resources, and the organization imposed thereon.

A large data storage array is an illustrative example. A traditional storage array (herein also referred to as a "disk storage array", "disk array", or simply "array") is a collection of storage entities, such as hard disk drives, solid state drives, tape drives, or other entities used to store information (for simplicity, hereinafter referred to as "disks"), operating together logically as a unified storage device. A storage array may be thought of as a system for managing a large amount of a resource, i.e., a large number of disk sectors.

Management of the resource may include allocation of a portion the resource in response to allocation requests. In the storage array example, portions of the storage array may be allocated to, i.e., exclusively used by, entities that request such allocation. One issue that may be considered during allocation of a resource is the selection process—namely, how to determine which unallocated portion of the collection of resources is to be allocated to the requesting entity.

Conventionally, all resources of the same type are treated the same because it was assumed that the performance of components within the data storage array performed similarly and data would be stored and accessed evenly across the array. Initially, this assumption may be valid because any performance differences between resources of the same type and any asymmetries in data usage are unknown. However, as the data storage array fills up and the stored data is accessed, some resources may be more heavily utilized than other resources of the same type and/or resources of the same type may begin to perform differently. For example, two identical 7,200 rpm disks may initially be assumed to have identical performance and share data storage and processing loads equally because the client initially stores 10 GB on each disk. However, at some later point in time, the client may either delete or rarely access the data stored on the second disk while constantly updating the files stored on the first disk. As a result, the first disk may operate with slower performance. While the client may have previously been able to observe this inefficiency, the client was unable to correct it because the client had no input or control regarding how slices were allocated or re-allocated. For example, no mechanism (e.g., slice allocation policy) currently exists for allocating a slice from a particular performance tier or other resource constraint specified by the client in a slice allocation request.

Accordingly, there exists a need for methods, systems, and computer readable medium for tier-based slice allocation and data relocation in a data storage array.

SUMMARY

According to one aspect, the subject matter described herein includes a method for tier-based slice allocation and data relocation in a data storage array. The method is performed at a data storage array including physical data storage capacity being logically divided into one or more logical units (LUs) and each of the one or more LUs being further subdivided into one or more slices, where the data storage array includes a resource pool being divided into a plurality of resource groupings, where each resource grouping includes one or more resources of a common type. The method includes receiving a slice allocation request for a slice from the data storage array, where the slice allocation request includes at least one constraint. In response to receiving the slice allocation request, a slice that honors the at least one constraint is allocated.

According to another aspect, the subject matter described herein includes a system tier-based slice allocation and data relocation in a data storage array. The system includes a data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type. A slice manager is configured to receive a slice allocation request for allocating a slice from the data storage array, where the slice allocation request includes at least one constraint. The slice manager is further configured to allocate a slice that honors the at least one constraint in response to receiving the slice allocation request.

The subject matter described herein for tier-based slice allocation and data relocation in a data storage array may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

Terminology

As used herein, a "resource" is a physical or logical resource of the system to be managed, and a "resource object" is a data construct or other abstraction used to represent a specific instance of a resource. Examples of physical resources include processors, buses, memories or portions of memories, storage entities or portions thereof. Examples of logical resources include accounts, users, quotas, permissions, access control lists, account balances, and timeslots.

As used herein, a "resource collection" or "collection" is a set of resources of the same type.

As used herein, an "interface" is a predefined mechanism by which certain functions or tasks are performed. For example, an interface may be a function, subroutine, class method, and the like. The interface abstraction is used so that the underlying manner of manipulating the objects is hidden from the entity that uses the interface, e.g., invokes the function or method. This gives flexibility, allowing a change of how the objects are stored, e.g., lists, hash tables, b-trees, etc., without any external changes.

As used herein, a "logical unit" or "LU" is a logical partition of data stored on a physical disk device.

As used herein, a "thin logical unit" or "TLU" is a sparsely populated LU provisioned at creation but which is not allocated any storage until the storage is actually needed.

As used herein, a "flare logical unit" or "fully allocated logical unit" or "FLU" is a fully allocated LU which is created by provisioning and allocating a certain amount of storage.

As used herein, a "direct logical unit" or "DLU" is a fully provisioned mapped LU with coarse mapping. Even though a DLU is seen as fully provisioned by a user, internally storage space is allocated on as needed basis.

As used herein, a "mapped logical unit" or "MLU" is a mapped LU, i.e., a LU managed by the MLU driver, i.e., a TLU or DLU.

As used herein, a "slice" is a portion of an LU.

As used herein, a "resource collection" is a collection of resources having the same type (e.g., Bus, RG, etc.).

As used herein, a "resource pool" is an amount of data storage for mapped LUs.

As used herein, a "tier" is a collection of storage of similar performance. Exemplary performance buckets may include "high performance," "medium performance," and "low performance."

As used herein, a "performance bucket" is a higher level resource grouping or abstraction which is logically located above all other existing resource groups managed by the slice manager (e.g., RG, Bus, etc.). While a performance bucket may correspond to a coarse tier, this need not always be the case. Exemplary performance buckets may include "high performance," "medium performance," and "low performance."

As used herein, a "fine tier" is an internal (not user-visible) tier indicative of expected performance of that tier.

As used herein, a "coarse tier" is an external (user-visible) tier that aggregates the expected performance of one or more fine tiers.

As used herein, a "tier descriptor" is value associated with a FLU which identifies a fine tier and embodies two properties: the index for the coarse tier to which the fine tier belongs, and the performance estimate for the fine tier.

As used herein, a "fine tier value" is an internal performance value very specific to a particular LU which could be derived based on the disk type, disk consumption, revolutions per minute (RPM), etc.

As used herein, a "coarse tier value" is a user visible performance value and this will be the aggregation of similarly performing LUs.

As used herein, a "request" is a slice manager policy requesting that a slice manager use its best effort to satisfy one or more constraints but will not fail if there are other available slices.

As used herein, a "requirement" is a slice manger policy requiring that a slice satisfy one or more constraints and will fail even if other slices are available but do not meet the policy.

As used herein, an "allocation" is to set apart for a special purpose; designate, distribute according to a plan; allot a certain amount of storage space in a pool.

As used herein, a "reservation" is a process of locking a certain amount of storage space in a pool.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein includes methods, systems, and computer readable media for tier-based slice allocation and data relocation in a data storage array. In contrast to conventional slice allocation algorithms which do not take into account a user-specified performance tier preference, the subject matter described below provides a mechanism for users to specify one or more constraints, such as a tier preference, when requesting a slice from a data storage array. For example, this may be accomplished by adding a tier descriptor for each LU.

With the addition of a tier descriptor per FLU, a client can request the slice manager to allocate a slice from a LU with a specific performance value. For example, the end user may be able to specify a "tier preference" of "high", "none", or "low" for mapped LUs. Conceptually, LUs with a tier preference of "high" may have their slices allocated from the slices in the highest performance bucket(s), LUs with a tier preference of "low" may have their slices allocated from slices in the lowest performance bucket(s), and LUNs with no tier preference may have their slices allocated from the entire pool using an existing splatter algorithm.

To support allocations based on the coarse tier value, in addition to tracking slices on a RG and Bus basis, a slice manager may track slices on a new layer called "Performance Buckets." Performance buckets may form the highest level resource grouping atop of existing groups (e.g., RAID Groups, Buses, etc.). All similarly performing slices may be tracked under one performance bucket and, in one embodiment which will be described in greater detail below, the number of performance buckets may match the number of coarse tiers.

Figure 1A:
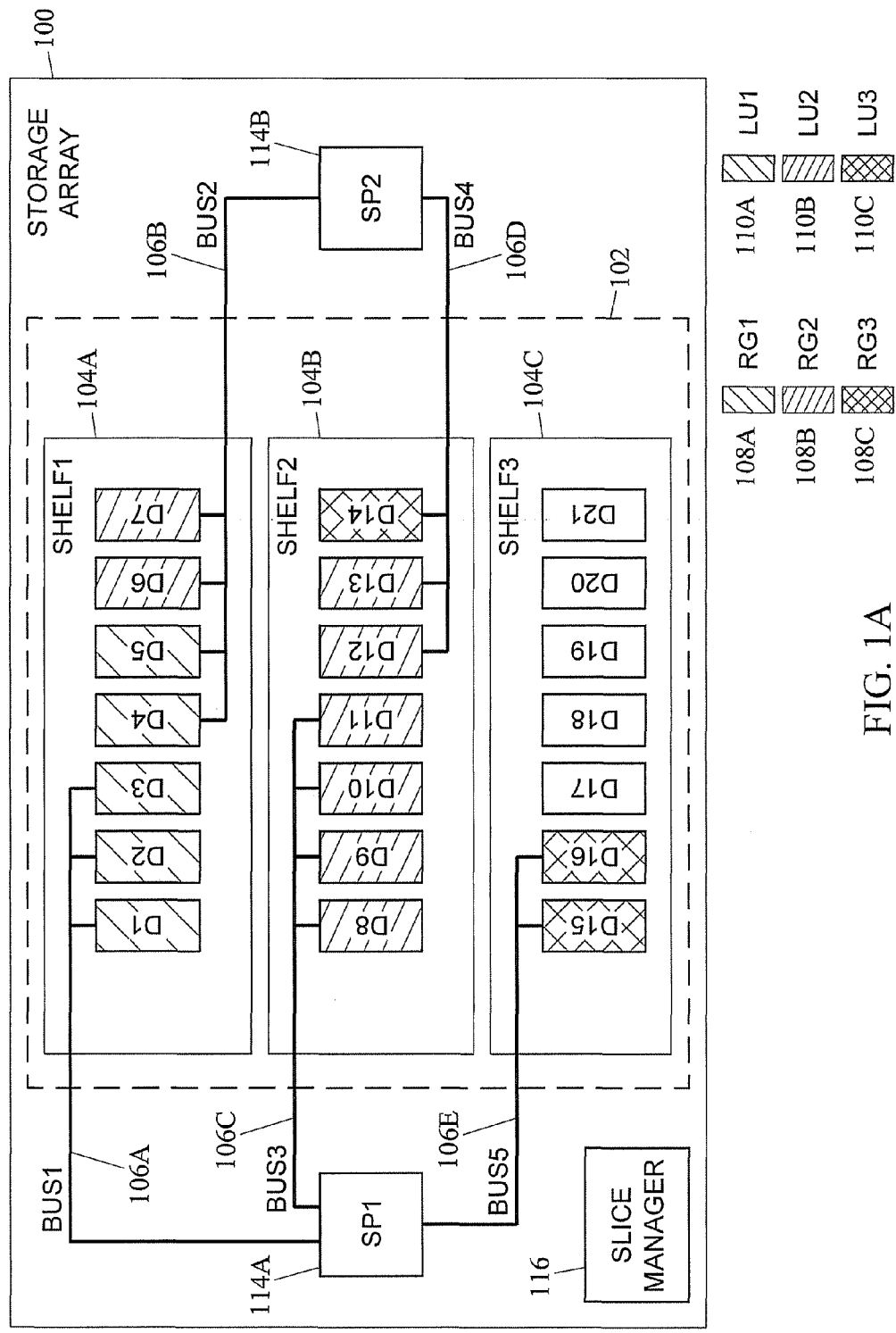
FIG. 1A is a block diagram illustrating an exemplary data storage array for tier-based slice allocation and data relocation in a data storage array according to an embodiment of the subject matter described herein.

FIG. 1A is a block diagram of an exemplary data storage array for tier-based slice allocation and data relocation in a data storage array according to an embodiment of the subject matter described herein. It may be appreciated that while the embodiment illustrated in FIG. 1A includes a data storage array, management of other systems or system resources may be used for implementing tier-based slice allocation and data relocation in a data storage array without departing from the scope of the subject matter described herein. Additionally, although the atomic unit of resource being allocated may be, for example, a single disk sector; a storage array may be organized into a hierarchical set of collections. For example, disks may be logically and/or electrically divided into "disks that are connected to one bus" and "disks that are connected to another bus"; disks may be grouped into RAID (redundant array of inexpensive disks) groups; RAID groups may be divided into logical units, or LUs; LUs may be subdivided into portions hereinafter referred to as "slices"; slices may be subdivided also, and so on. If the system is designed such that each disk is connected to only one bus, and each bus may be managed by a separate storage processor. For example, the natural boundary of physical connection to one bus or another may dictate that the organizational structure of a RAID group be constrained to one bus, e.g., that a RAID group cannot span multiple buses. The organizational structure of an LU may be similarly constrained, e.g., that an LU cannot span multiple RAID groups. In this example, the high level abstraction of a RAID group allows a collection of individual disks to be treated as a single, large disk, an abstraction that simplifies management of that collection of disks.

Referring to FIG. 1A, storage array 100 may include multiple storage devices 102, which are typically hard disk drives, but which may be tape drives, flash memory, flash drives, other solid state drives, or some combination of the above. In one embodiment, storage devices 102 may be organized into multiple shelves 104, each shelf containing multiple storage devices 102. In the embodiment illustrated in FIG. 1A, storage array 100 includes three shelves, Shelf1 104A, Shelf2 104B, and Shelf2 104CB. Shelves 104A-104C each contain seven storage devices, D1-D21. In one embodiment, each storage device 102 may be connected to one or more buses 106. In the embodiment illustrated in FIG. 1A, each shelf 104 has two buses 106, at least one of which connects to every device 102 on each shelf 104. For example, Shelf1 104A has two buses, Bus1 106A and Bus2 106B, where Bus1 106A is connected to devices D1-D3 and Bus2 106B is connected to devices D4-D7. Similarly, Shelf2 104B has two buses, Bus3 106C and Bus4 1060, where Bus2 106C is connected to devices D8-D11 and Bus3 106D is connected to devices D12-D14. Lastly, Shelf3 104C has one bus, Bus5 106E, where Bus5 106E is connected to devices D15-D16. Remaining storage devices D17-D21 are not shown connected to any busses or associated with any RAID group for simplicity purposes only. It may be appreciated that the configuration of storage array 100 as illustrated in FIG. 1A is for illustrative purposes only, and is not to be considered a limitation of the subject matter described herein.

In addition to the physical configuration, storage devices 102 may also be logically configured. For example, multiple storage devices 102 may be organized into redundant array of inexpensive disks (RAID) groups, or RGs 108, shown in FIG. 1A being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used. Storage processors 114 may maintain information about the structure of the file system whose contents are being stored in the allocated slices. For example, SP1 114A may be connected to Bus1 106A, Bus3 106C, and Bus5 106E for managing disks D1-D3, D8-D11, and D15-D16. Similarly, SP2 114B may be connected to Bus2 106B, and Bus4 106D for managing disks D41-D7, and D12-D14.

In one implementation of storage array 100, each logical unit 110 may be associated with a slice allocation table (SAT), which is used to record information about each slice 112, such as the TLU that is using the slice 112 and whether the slice is free or allocated. The SAT may be stored in the logical unit 110, or it may be stored outside the logical unit 110 to which it is associated. In order to avoid contention between two or more storage processors 114 attempting to modify a particular SAT, each SAT may be controlled by only one storage processor 114. The storage processor 114 that has been given ownership of a particular SAT is hereinafter referred to as the "claiming SP" for that SAT. Since the SAT for a logical unit 112 contains information about slices within that logical unit 112, the claiming SP of a SAT may be said to be the claiming SP of the logical unit, also. The remaining storage processors 114 that are not the claiming SP for a logical unit 112 may be hereinafter referred to as the "peer SP". Thus, every logical unit 112 may have one claiming SP and one or more peer SPs. Since the claiming SP may be determined for each logical unit 112 individually, logical units within the same RAID group 110 may have different claiming SPs.

Figure 1B:
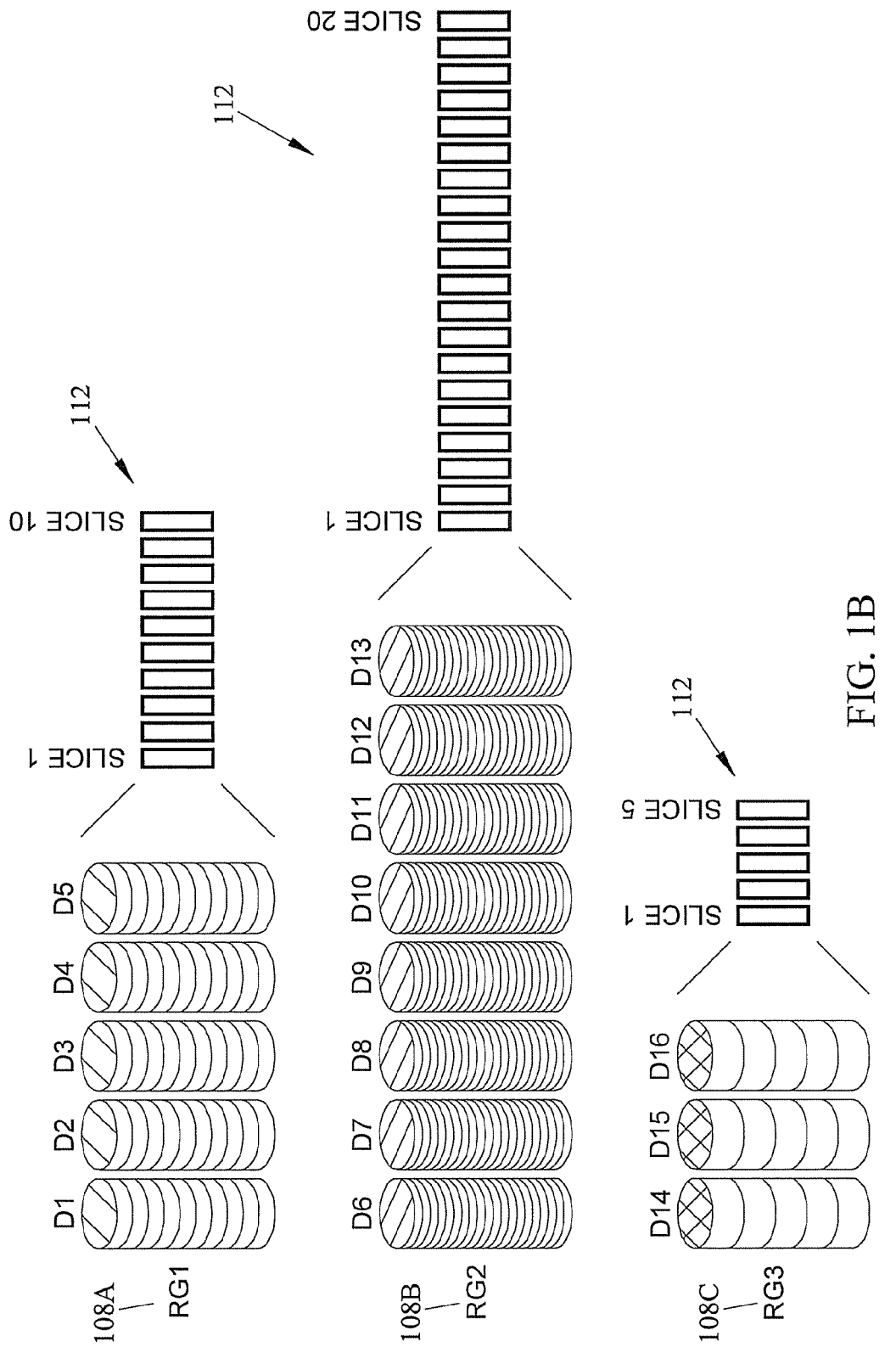
FIG. 1B is a diagram illustrating an exemplary logical division of the data storage array of FIG. 1A into RAID groups and slices for tier-based slice allocation and data relocation in a data storage array according to an embodiment of the subject matter described herein.

FIG. 1B is a diagram illustrating an exemplary logical division of the data storage array shown in FIG. 1A into RAID groups and slices for tier-based slice allocation and data relocation in a data storage array according to an embodiment of the subject matter described herein. For example, storage entities 102 described above, which may refer to either a single storage device or a RAID group operating as a single storage device, may be further sub-divided into logical units. A single RAID group or individual storage device may contain one or more logical units (LUs) 110. In the embodiment illustrated in FIG. 1B, RAID groups 108 also correspond to LUs 110. For example, RG1 108A may correspond to LU L1 110A, RG2 108B may correspond to LU L2 110B, and RG3 108C may correspond to LU L3 110C. It may be appreciated, however, that RAID groups need not correspond to LUs and that RAID groupings may be further divided into two or more LUs without departing from the scope of the subject matter described herein.

In addition to RAID groups, each logical unit 110 may be further subdivided into portions of a logical unit, referred to as "slices" 112. In the embodiment illustrated in FIG. 1B, RG1 108A/LU1 110A is shown divided into ten slices 112, SLICE1-SLICE10; RG2 108B/LU2 110B is shown divided into twenty slices 112, SLICE1-SLICE20; and RG3 108C/LU3 110C is shown divided into five slices 112, SLICE1-SLICE5. Slices 112 may be allocated, de-allocated, re-allocated, reserved, or redistributed by slice manger 116.

Slice manager 116 may be a software application or layer that is executed, at least in part, by one or more SPs 114. Slice manager 116 may be responsible for implementing a slice allocation policy and/or algorithm. For example, slice manager 116 may receive slice allocation requests, service slice allocation requests, and maintain relevant statistical information regarding slices.

As described above, depending upon the physical characteristics of the system, the collections of resources may have physical, electrical, or logical constraints on their use. Using the embodiment illustrated in FIG. 1A, for example, a RAID group 108 may span more than one shelf 104 if the RAID controller is connected to at least one bus 106 on both shelves 104; if the RAID controller is associated with only one bus 106, or with buses 106 of only one shelf 104, a RAID group 108 cannot span multiple shelves 104. Similarly, an LU 110 may or may not span multiple storage entities, depending on the configuration of storage array 100.

In the simplified view shown in FIGS. 1A/1B, a pool of storage devices 102 may be organized into multiple RAID groups 110, where each RAID group may be further divided into a number of LUs from which slices 114 are allocated Slices that are allocated may be physically located anywhere in storage array 100. As will be discussed in more detail below, these slices may be located more or less contiguously, but they may also be distributed more or less evenly across all physical resources, depending on the slice selection and allocation policy or algorithm.

System resources can be organized into resource pools. For example, array 100 may contain a pool (i.e., collection) of shelves 104, RAID groups 110, buses 106, storage entities 102, LUs 110, and slices 112. Thus, resources to be allocated by slice manager 116 include slices 112, where slices 112 are portions of logical units 110, logical units are portions of RAID groups 108, and RAID groups occupy one or more buses 106. In one embodiment, each resource object may include a header identifying the data structure as a generic resource manager (RM) object and slice statistics indicating how many total slices exist within that resource, how many of the total slices are allocated, etc. In alternative embodiments, slice statistics may be data stored within the resource object, a pointer to slice statistics stored elsewhere, or a function call to a slice statistics manager that provides this information, for example.

According to various aspects of the subject matter described herein, slice manger 116 may support various policies which are described in greater detail below.

In one embodiment, slice manger 116 may support a specific performance range policy. This policy indicates that only a specific range of tier values is acceptable for the new slice. If a slice is not available within that tier range, the allocation will fail.

When a required performance range is applied, the range may be treated from highest to lowest expected performance when choosing the best performance bucket resource. The highest performance bucket resource with available slices within the range may be used to satisfy the request—if any additional constraints cannot be met within that performance bucket, the next highest performance bucket with available slices within the range may be used until the performance range is exhausted. While the specific performance range policy described above may most often be used when selecting a destination slice for a relocation operation rather than for initial allocation, this is not intended to be limiting.

In another embodiment, slice manger 116 may support a highest tier preference policy. This policy indicates that the slice should be allocated from the highest tier that has available slices and meets any other selection criteria. This policy may be used for initial allocations.

In another embodiment, slice manger 116 may support a lowest tier preference policy. This policy indicates that a slice should be allocated from the lowest tier that has available slices and meets any other selection criteria. This policy may also be used for initial allocations.

In another embodiment, slice manger 116 may support a no tier preference policy. This policy indicates that the requesting LU does not have a preference as to which tier its slices are initially allocated from. In this case, a performance bucket with the least allocated space may be selected. Other slice selection algorithms may also be used without departing from the scope of the subject matter described herein and are more fully described in U.S. patent application Ser. No. 12/164,959 entitled, "Methods, Systems, and Computer Readable Medium for Dynamic, Policy-Based Allocation of System Resources." This policy may also be used for initial allocations.

In another embodiment, slice manger 116 may support a specific RAID group policy. This policy indicates that the requesting LU requests or requires a slice from a designated RAID group. If no slices are available from that RAID group, or if there are no slices available that meet all other constraints, the request may fail, or not fail depending on whether it was a request or a requirement. It may be appreciated that a specific RAID group can belong to multiple busses and/or multiple performance buckets and that, therefore, the selection algorithm may search across each bus and performance bucket that is allowed (due to additional constraints). Typically, this specific RAID group policy may be used in selecting a destination slice for a relocation operation and not for initial allocation.

In another embodiment, slice manger 116 may support a specific SP policy. This policy indicates that the requesting LU requests or requires a slice from a designated SP. In the case of a requirement, if no slices are available from that SP or from that SP that meet all other constraints, the request fails. Typically, this policy may be used in selecting a destination slice for a relocation operation.

Figure 2:
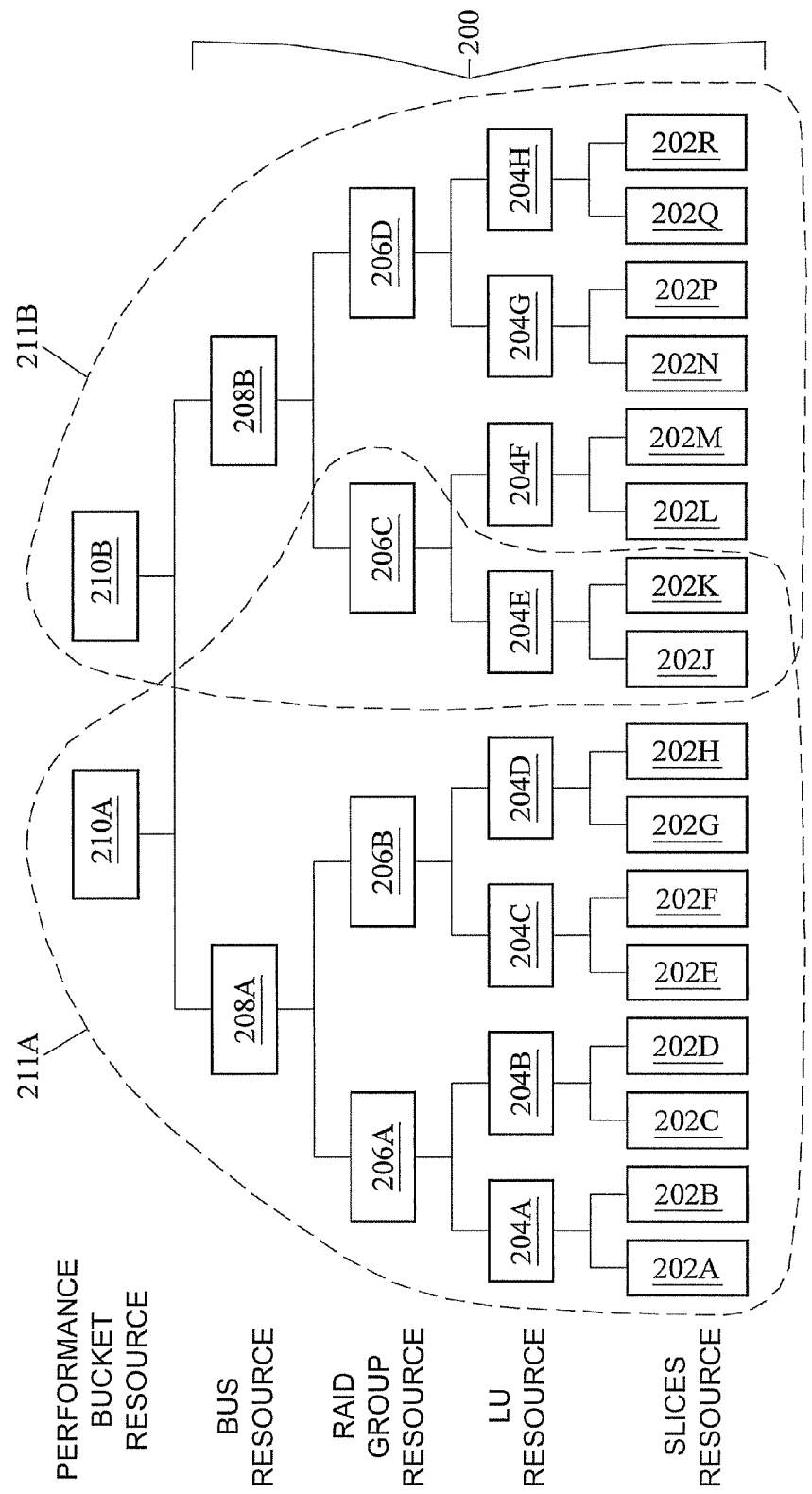
FIG. 2 is a block diagram illustrating an exemplary logical hierarchy of resources within a data storage array for tier-based slice allocation and data relocation in a data storage array according to an embodiment of the subject matter described herein.

FIG. 2 is a block diagram illustrating an exemplary logical hierarchy of resources within a data storage array for tier-based slice allocation and data relocation in a data storage array according to an embodiment of the subject matter described herein. A pool may be broken down into performance buckets. These buckets can be thought of as a higher level resource grouping atop the existing resource grouping in slice manager 116.

Just as the bus resource may be a collection of raid groups that contain physical disks on that bus, the performance bucket resource may be a collection of FLUs that belong to the same performance bucket, further grouped by their owning RAID groups and busses. It may be appreciated that a FLU may only be a child of a specific performance bucket, but that both RAID groups and busses can exist in multiple performance buckets. This is analogous to RAID groups potentially existing on multiple busses in conventional designs. The difference is that if a single FLU can only exist in a single performance bucket, the individual RAID group and bus resources need only track their slice usage within a single performance bucket.

A pool may be conceptually broken down into a set of performance buckets (i.e., collections of slices with similar performance). It may be possible that the breakdown of performance buckets matches the breakdown of coarse tiers, but it is not required.

In one embodiment, the number of performance buckets may be fixed and may be derived from the tier descriptors of FLUs using a bitmask. From the tier descriptor, the coarse tier ID can be obtained. The mask will determine how many of the most significant bits of the coarse tier ID will be used to create the performance tiers. For example, a mask of 8 bits may indicate that the 8 most significant bits of the tier descriptor should be used for the performance tier breakdown and, thus, there will be 256 performance tiers (i.e., $2^8=256$).

Referring to FIG. 2, current resource hierarchy 200 may include a plurality of LU resources (i.e., LU resource group 202). For example, the exemplary hierarchy shown in FIG. 2 may include LUs 202A-202H. Each LU resource 202A-202H may be further divided into a plurality of slice resources 204 (slices). For example, each of LUs 202A-202H are shown divided into two slices (e.g., LU 202A may be divided into slice 204A and 204B, and so on).

The logical resource grouping above LUs 202 may include RAID group resource group 206 (i.e., RAID resources 206A-206D). For example, multiple LUs, such as LU 202A and 202B, may be grouped together to form RAID group 206A. Above RAID group resources 206A-206D may be one or more bus resources. For example, bus resource 208A may be associated with RAID groups 206A and 206B, while bus resource 208B may be associated with RAID groups 206C and 206D.

However, in contrast to previous storage array logical resource hierarchies, a performance bucket resource tier 210 may be implemented above: bus resource tier 208, RAID group tier 206, LU resource tier 202, and slice resource tier 204. All similarly performing slices will be tracked under one performance bucket 210A or 210B. Additionally, resources 202-208 may belong to multiple performance buckets 210. For example, performance bucket 210A may be associated with resources 211A which includes slice resources 204J and 204K. Likewise, performance bucket 210B may be associated with resources 211B which also includes slice resources 204J and 204K. Thus, different performance buckets (e.g., 210A and 210B) may be associated with separate but overlapping (or separate and non-overlapping) sets of data storage resources.

When a FLU is added to a pool, a tier descriptor value may be assigned to that FLU. This value indicates a FLU's expected performance, with higher expected performance indicating better expected performance than a FLU with a lower expected performance value. The FLU resource (in addition to its owning RAID group and busses) may be added to the appropriate performance bucket based on a SPLATTER_MASK indicating how many bits of the coarse tier index (derived from the tier descriptor) are used to group coarse tiers. Specifically, FLUs that are similar in performance (as defined by the SPLATTER_MASK) as provided in their associated tier descriptor value may belong to the same performance bucket.

Just as other resources may track their slices, the performance bucket resource may track the number of slices it contains and the number of slices used from that bucket. However, unlike other slices, the performance bucket resource may have multiple selection methods to choose the "best" resource. For example, if the selection method is "high preferred," the performance bucket representing the highest performing slices with available slices may be selected. If the selection method is "low preferred," the performance bucket representing the lowest performing slices with available slices may be selected. This will require the selection logic to be able to "order" the buckets via a property, specifically the tier descriptor prior to applying the selection algorithm.

Figure 3:
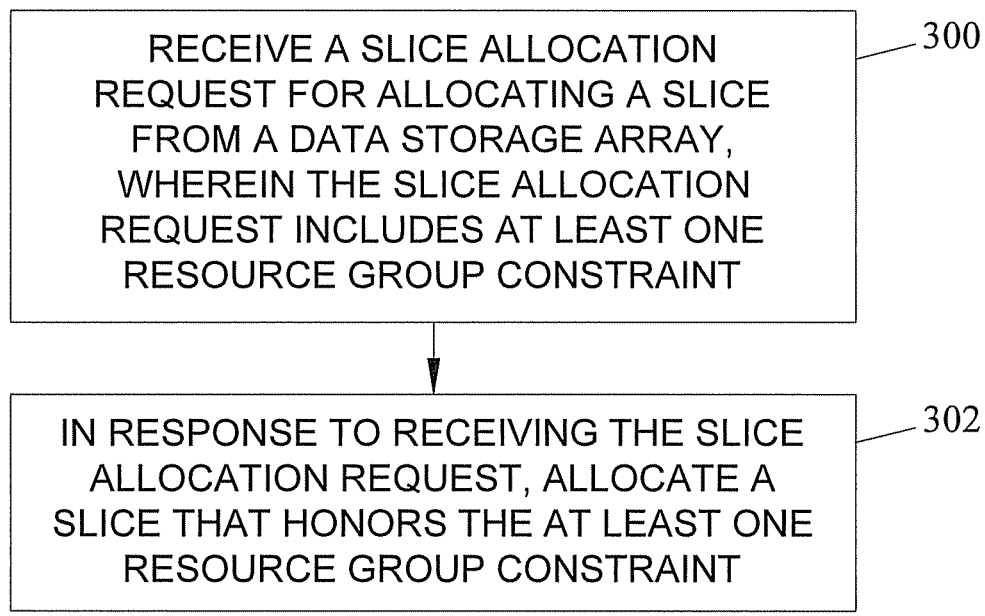
FIG. 3 is a flow chart illustrating an exemplary process for tier-based slice allocation and data relocation in a data storage array according to an embodiment of the subject matter described herein.

FIG. 3 is a flow chart illustrating an exemplary process for tier-based slice allocation and data relocation in a data storage array according to an embodiment of the subject matter described herein. Referring to FIG. 3, at block 300, a request may be received for allocating a slice that includes at least one resource constraint. For example, in one embodiment, a new parameter may be added to the slice selection application programming interface (API) to allow the caller to identify constraints it requests or requires on the slice allocation process. This parameter will be a container that can potentially hold multiple constraints.

At block 302, the slice allocation request may be processed by allocating a slice that honors the at least one resource constraint. For example, in one implementation, a series of comparisons may be performed for each level of the resource hierarchy, where multiple constraints may be applied to each resource. As described in U.S. patent application Ser. No.

12/164,959 entitled, "Methods, Systems, and Computer Readable Medium for Dynamic, Policy-Based Allocation of System Resources," previous methods of slice allocation simply provided the "best" available slice in response to a slice allocation request by performing a series of comparisons may be performed for each level of the resource hierarchy that applied a single constraint to each resource. Specifically, individual resource types currently contain a comparison routine with a single generic object that can be used as a "filter" to indicate if a particular resource is acceptable (e.g., a specific FLU is only acceptable if it is within the RAID group that was selected earlier in the slice selection process.)

For tiering support, multiple constraints may be provided that can be applied to each resource. Each resource may be updated to handle the new constraints and the resource manager may be updated to include new constraints introduced by the client and resources higher on the resource tree. It may be appreciated that that there is no requirement that all constraints be recognized by all resource types. For example, a "required SP" constraint may not have to be recognized by the tier or RAID group resource types, but may have to be recognized and utilized by the LU resource type.

While allocating a slice, a selection constraint may be passed in by the clients that slice manager 116 may enforce when selecting a slice. For example, an exemplary constraint may include that the slice should to be selected should/must come from a specific performance tier or a RAID group. The passed-in selection constraint may be enforced on top of the pool's resource allocation policy. Any conflicting constraints may be handled by the clients. Poaching, as used herein, is when a second storage processor (e.g., SP2) is allowed to have a slice allocated to it, despite the fact that it has already been affined to a first storage processor (e.g., SP1). Affining is the association of an LU with a particular SP, and may cause orphaning. Orphaning occurs when SP1 needs slices, but the only available slices belong to an LU that has already been affined to SP2. Unless "poaching" is allowed, those slices are "orphaned" with respect to SP1, meaning that the slices will not be allocated to SP1. Poaching may be used to avoid orphaning. For example, for a pool with a non-poaching policy, the selection constraint passed by a client should not have the slice allocation SP as the one that is not the default allocation SP of a file system.

For preference types of "high," the performance bucket resource selection should start from the highest tier and work toward lower tiers and select the performance bucket of the highest tier with slices available. The first performance bucket found with available slices will be selected, even if this means poaching from the other SP.

For preference type of "low", the performance bucket resource selection should start from the lowest tier and work toward higher tiers and select the performance bucket of the lowest tier with slices available. The first performance bucket found with available slices will be selected, even if this means poaching from the other SP.

For preference type of "none", the performance bucket selection should start from the performance bucket with the least number of allocated slices. If that bucket contains no slices affined to the LUN's allocation owner, however, the performance bucket selection should continue to the bucket containing the next least number of allocated slices and should only poach from the other SP if no performance buckets contain slices affined to the LUN's allocation owner.

Once a performance bucket has been selected, the existing splatter algorithm may be applied (potentially with new constraints) to choose the bus, RAID group, and FLU from which the slice is selected.

Figure 4:
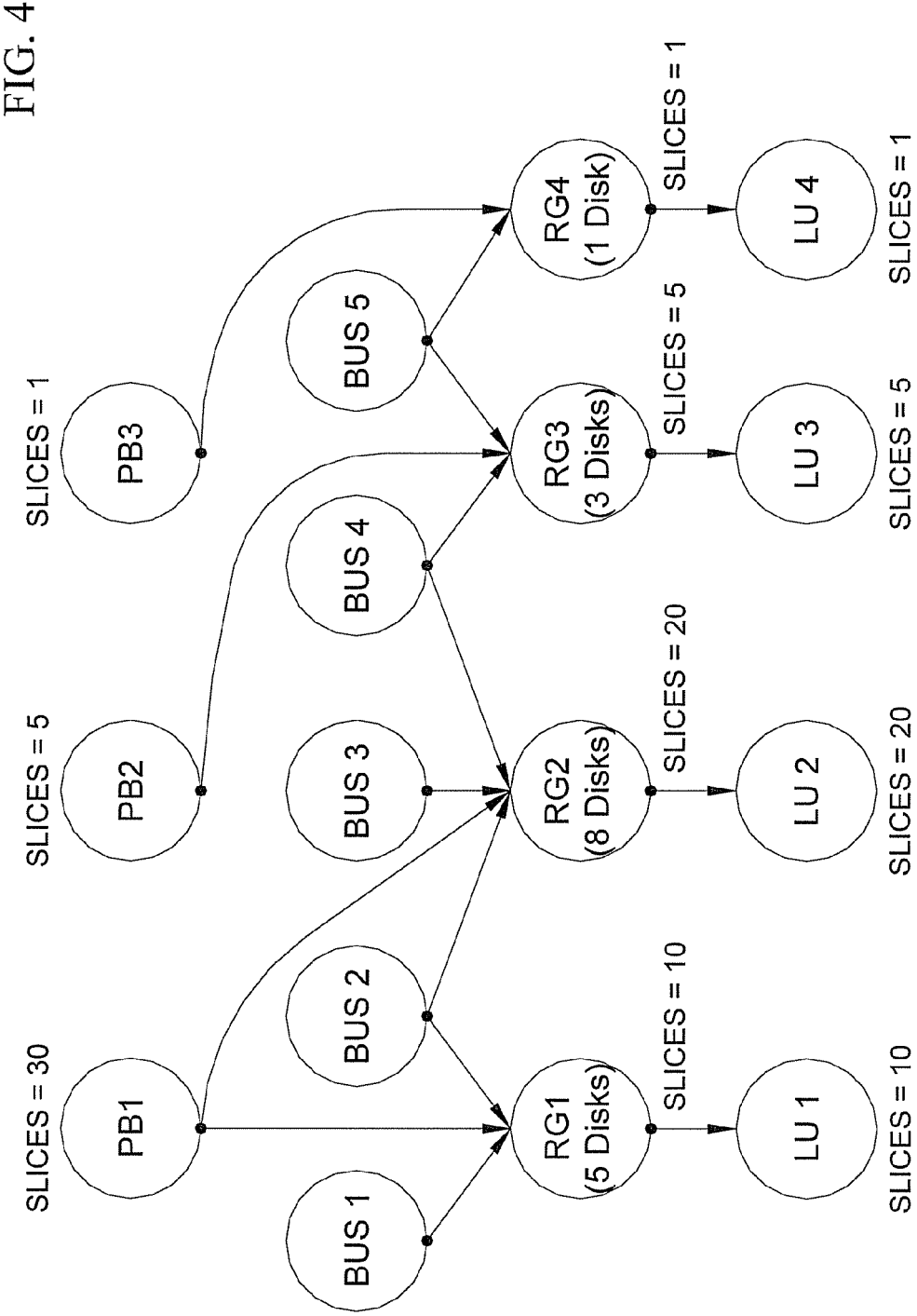
FIG. 4 is a diagram illustrating an exemplary process for servicing a slice allocation request indicating no tier preference including application of a default "brown" allocation policy/splattering slice allocation algorithm according to an embodiment of the subject matter described herein.

FIG. 4 is a diagram illustrating application of a default "brown" allocation policy/splattering slice allocation algorithm according to an embodiment of the subject matter described herein. The default search order that slice manager 116 follows while selecting a LU for allocating a slice is the order in which resource collections are placed in the hierarchy. Once a resource collection to be searched is identified, slice manager 116 may search through that collection and find the best resource.

In order to calculate the number of slices available to a performance bucket, the following calculations may be made. First, the number of slices in each LU may be determined. For example, LU1 contains 10 slices, LU2 contains 20 slices, LU3 contains 5 slices, and LU4 contains 1 slice. Next, the number of slices in each raid group may be determined. In the embodiment shown, two assumptions may allow for easier calculation of the number of slices in each raid group. The first assumption may be that there is a 1:1 association between raid groups and LUs. The second assumption may be that each slice is shared equally among all disks in a particular raid group. This latter assumption may improve the performance of each slice because disk accesses may be spread equally among multiple disks. However, it is appreciated that other relationships between slices and disks in a raid group may be made without departing from the scope of the subject matter described herein. Returning to the embodiment shown, RG1 may include 10 slices, RG2 may include 20 slices, RG3 may contain 5 slices, and RG4 may contain 1 slice. If multiple FLUs, RAID groups, or busses meet all requirements, the existing splatter algorithm may be used to choose the FLU from the set of resources that meets the requirements. Because, in this example, PB1, PB2, and PB3 are associated directly with RAID groups, rather than busses, the number of slices available to each performance bucket is equal to the total number of slices available to each associated RAID group. It is appreciated that, in the embodiment shown in FIG. 4, a RAID group may only be associated with a single performance bucket. Therefore, if RG1 is associated with PB1, RG1 may not also be associated with PB2. Referring to the embodiment shown in FIG. 4, PB1 is associated with RG1 and RG2, PB2 is associated with RG3, and PB3 is associated with RG4. Therefore, 30 slices are available to PB1 (i.e., 10+20), 5 slices are available to PB2, and 1 slice is available to PB3.

In a similar manner, but disassociated from the accounting of the number of slices available to each performance bucket described above, the number of slices associated with each bus may be calculated. According to exemplary bus descriptors (not shown), Bus1 is connected to the first three disks in RG1 and Bus 2 is connected to the next two disks of RG1 and the first two disks of RG2 (for a total of four disks), Bus3 is connected to the next four disks of RG2, Bus4 is connected to the last two disks in RG2 and one disk in RG3, and Bus5 is connected to two disks in RG3 and one (i.e., the only) disk in RG4. Therefore, since each disk in RG1 contains 10 slices, the total number of slices accessible by Bus1 is 30 (i.e., 3 disks*10 slices/disk). Similar calculations may be performed for the remaining busses. Specifically, Bus2 may access a total of 60 slices (i.e., (2 disks*10 slices/disk=20)+(2 disks*20 slices/disk)=40), Bus3 may access a total of 80 slices (i.e., 4 disks*20 slices/disk), Bus4 may access a total of 45 slices (i.e., (2 disks*20 slices/disk=40)+(1 disk*5 slices/disk=5)), Bus5 may access a total of 11 slices (i.e., 2 disks*5 slices/disk+1 slice).

Returning to FIG. 4, it may be appreciated that slices have been associated with one or more coarse tiers (e.g., high performance, medium performance, and low performance).

Further, slice manager 116 may associate three performance buckets corresponding to the three tiers labeled PB1, PB2, and PB3. In the embodiment shown in FIG. 4, PB1 may include a high performance bucket, PB2 may include a medium performance bucket, and PB3 may include a low performance bucket. As discussed above, it may be appreciated that in addition to being associated with performance, different performance buckets may also be associated with, for example, high-, medium- and low-energy consumption or other metrics. Further, it may be appreciated that the number of performance buckets may be greater or lesser than the number of coarse tiers to the without departing from the scope of the subject matter described herein.

A client can request that a slice be allocated from any of the three tiers or without any tier preference. Slice manager 116 may use its default splattering algorithm to allocate a slice when a client does not specify any tier preference. Slice manager 116 may determine which resource to choose at random by working its way through a hierarchy in order from performance bucket, to bus, to raid group, to LU, and finally to a slice. For example, slice manager 116 may select PB2 from among PB1-PB3. Because PB2 is connected to Bus2, Bus3, and Bus4, slice manger may next select Bus3 at random from Bus2-Bus4. Next, as Bus3 is only associated with raid group 2, slice manger must select from its only available choice and choose raid group 2. Likewise, in the embodiment shown, LU2 is the only LU associated with RG2, and therefore it must also be selected by slice manager 116. Finally, one of the 20 slices associated with LU2 may be chosen by slice manager 116.

Additional details of the default splattering algorithm are described more fully in commonly owned U.S. patent application Ser. No. 12/164,959 entitled, "Methods, Systems, and Computer Readable Medium for Dynamic, Policy-Based Allocation of System Resources." In addition to randomly selected each available resource at each level of the hierarchy, a static, pre-defined policy may also be applied for traversing the hierarchy.

Next, an embodiment is described where a client requests that the slice allocated by the slice manager 116 is selected from a particular performance bucket but is not correctly performed. This will be contrasted with an embodiment according to the subject matter described herein which dynamically adjusts the search order for traversing the hierarchy such that the slice allocation request may be properly processed.

Figure 5A:
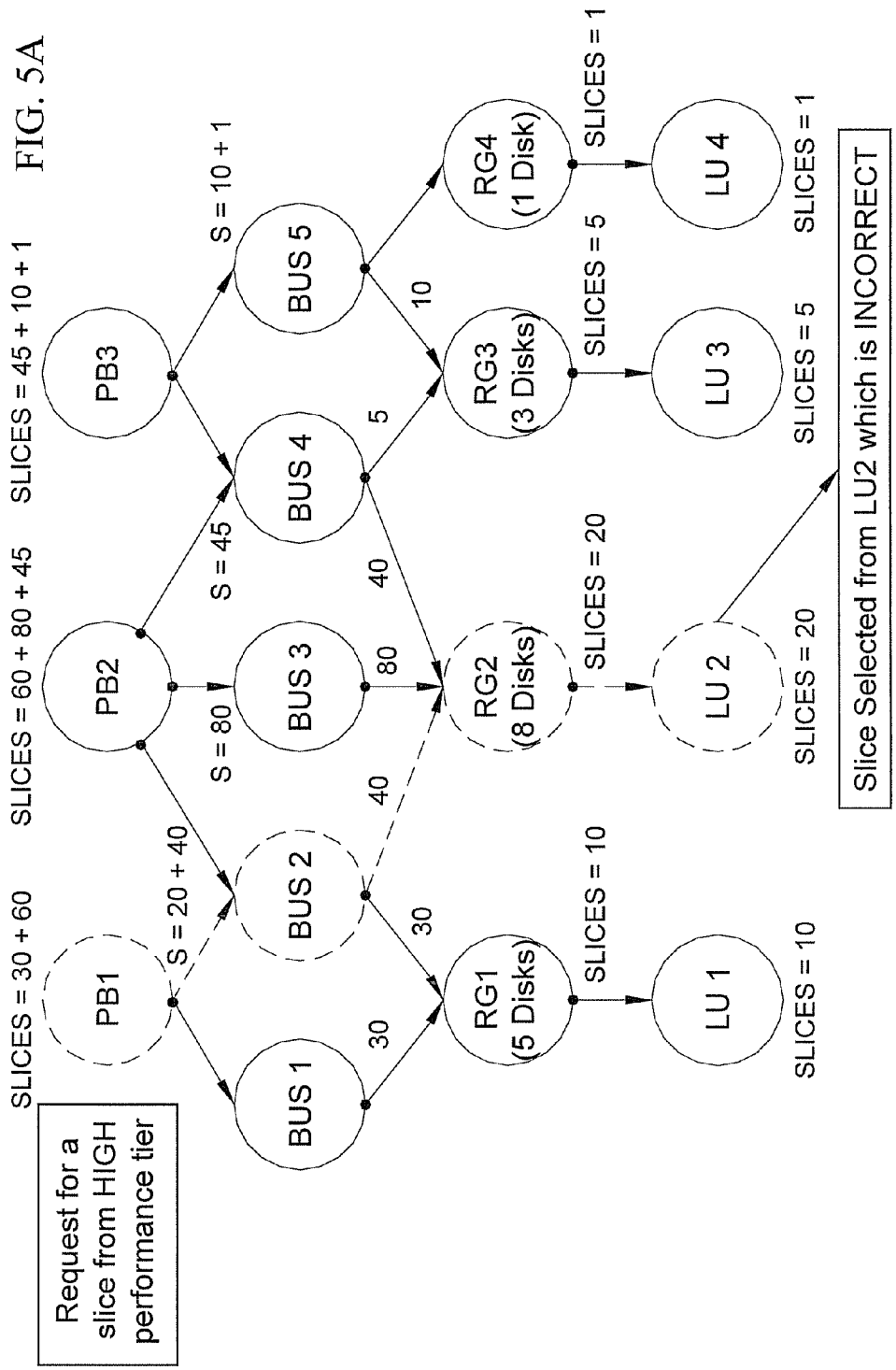
FIG. 5A is a diagram illustrating an exemplary process for servicing a slice allocation request indicating a preference for a high performance tier utilizing a static search approach according to an embodiment of the subject matter described herein.

FIG. 5A is a diagram illustrating an exemplary process for servicing a slice allocation request indicating a preference for a high performance tier utilizing a static search approach according to an embodiment of the subject matter described herein. As may be appreciated, the configuration shown in FIG. 5A is the same as that shown in FIG. 4. Specifically, LU1 is associated with RG1 and contains 10 slices, LU2 is associated with RG2 and contains 20 slices, and LU3 is associated with RG3 and contains 5 slices. RG1 is accessible by Bus1 and Bus2; RG2 is accessible by Bus2, Bus3, and Bus4; RG3 is accessible by Bus4 and Bus5; and RG4 is accessible by Bus5. Lastly, performance buckets corresponding to high, medium, and low performance data storage resources are associated with Busses 1-5. Specifically, PB1 (high performance) is associated with Bus1 and Bus2; PB2 (medium performance) is accessible by Bus2, Bus3, and Bus4; and PB3 (low performance) is accessible by Bus4 and Bus5.

According to a naïve approach, if a client specifies a tier preference while allocating a slice, slice manager 116 may first identify the performance bucket associated with that slice. After that, slice manager 116 may proceed with its default search order to find the best resource for allocating a slice. However, as mentioned above, slice manager 116 default's search mechanism may result in selecting a slice that is from a tier that is not requested by client. The problem occurs because of the fact that a Bus object could be a part of more than one performance bucket. Because of this, the slice statistics in a bus object includes all the slices regardless of their performance values. Since slice manager 116 relies on slice statistics for picking the best resource, it ends up picking an incorrect slice.

For example, in the event that client requests a slice from a high performance tier, slice manager 116 may select PB1 as the high performance bucket associated with the high performance tier. Next, Bus2 may be selected from among Bus1 and Bus2 and RG2 may be selected from among RG1 and RG2. Like above, because only LU2 is associated with RG2, LU2 may be selected as the only choice once RG2 is selected and, finally, slice may be selected from LU2. However, slice is not a high performance slice. Thus, by following a traditional search order, the allocated slice may satisfy all searching rules but violate the performance bucket requirement.

Figure 5B:
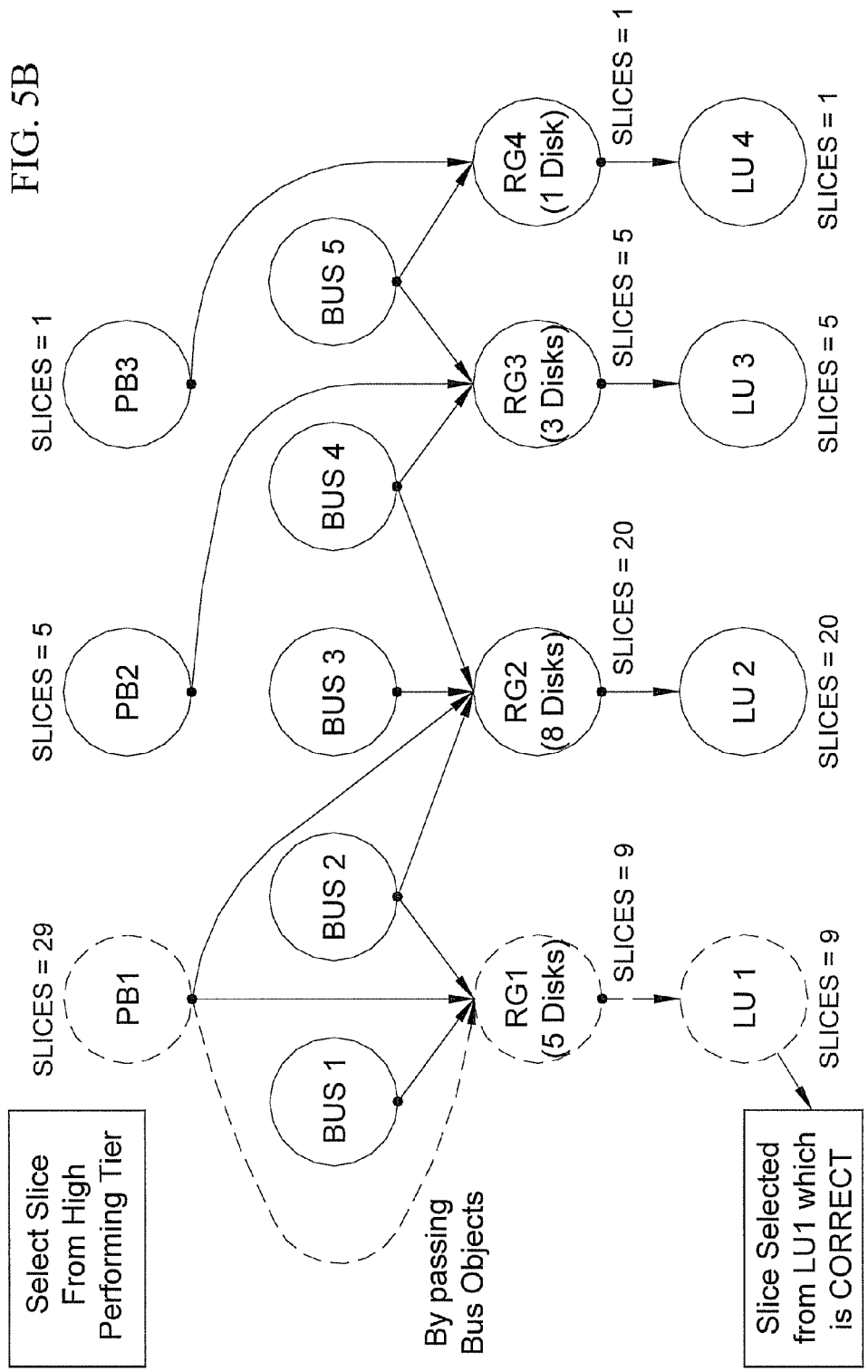
FIG. 5B is a diagram illustrating an exemplary process for servicing a slice allocation request indicating a preference for a high performance tier utilizing a dynamic search approach according to an embodiment of the subject matter described herein.

FIG. 5B is a diagram illustrating an exemplary process for servicing a slice allocation request indicating a preference for a high performance tier utilizing a dynamic search approach according to an embodiment of the subject matter described herein. In order to solve this problem, slice manager 116 may implement a "Dynamic Search Order" mechanism that is explained below. The dynamic search order mechanism may include a flexible search ordering mechanism through which slice manager 116 dynamically determines which resource collection to be picked 'next' at each level in the hierarchy while allocating a slice from a specific performance tier. For example, slice manager 116 may bypass bus objects in finding the best LU.

Referring to FIG. 5B, in contrast to the example scenario shown in FIG. 5A where a slice allocation request for a high performance slice resulted in allocating a slice from LU2 (i.e., not a high performance slice), by dynamically determining the search order of resource hierarchy 200, the correct high performance slice may be allocated from LU1. For example, in response to receiving a slice allocation request for a high performance slice, PB1 may bypass bus resources (e.g., Bus1 and Bus2) and instead determine the appropriate RAID group. In this example, PB1 is associated with only one RAID group, RG1, which is selected. Likewise, in this example, RG1 is associated with only one LU, LU1, from which a slice is allocated. However, it is appreciated that the dynamic search order process described herein may be applied to performance buckets that are associated with multiple RAID groups and/or LUs without departing from the scope of the subject matter described herein.

According to one aspect, when a FLU is added to the pool, the tier definition value for that FLU may be obtained. The tier definition value may determine which performance bucket contains this FLU. Similar to the other resource types, the total slices for the performance bucket for that FLU may also be updated to include the unallocated slices from that FLU. It may be appreciated that this assumes that all slices on a FLU have the same tier definition value, but that other embodiments are intended to be within the scope of the subject matter described herein.

In one embodiment, it may be preferable to place reservations in specific performance buckets. For example, if a "high tier preference" LUN set a reservation of 20, it may be preferable for the set of 20 reserved slices to be from the highest tier available at that time. It may also be preferable to restrict non-"high tier preference" LUNs from getting those 20 reserved slices (the same principle applies to "low tier preference" LUNs). The subject matter described herein does not attempt to keep the "no preference" LUNs from getting higher or lower performing slices. Instead, "no preference" LUN slice selection may typically be splattered across all available slices.

According to another aspect, slice allocation requests may be associated with a slice relocation. When a new slice is requested as a destination slice for a relocation operation, the constraints can be firmer in order to avoid potentially causing different performance than that which is being explicitly requested.

To this end, additional constraints for "required performance range," "specific raid group", and "specific SP" may be added. This allows an external component (such as the Policy Engine) to move a slice to a specific performance range, to a specific raid group for load balancing, and to require that the slice comes from a specific SP to avoid causing potentially worse performance due to redirection.

Once the best LU is found, slice manager 116 may use a bottom-up approach (rather than top-down) in updating the statistics in all the objects (including Bus objects) in the tree. Slice manager 116 may need to track the number of unallocated reserved slices per tier preference. To initialize these numbers, individual file systems may "register" their unallocated reserved counts during init or whenever their reservation needs change (including changes in a LUN's tier preference property). Slice manager 116 may need to view the unallocated reservations as unusable for slice selection requests coming from a LUN with a different tier preference.

Figure 6:
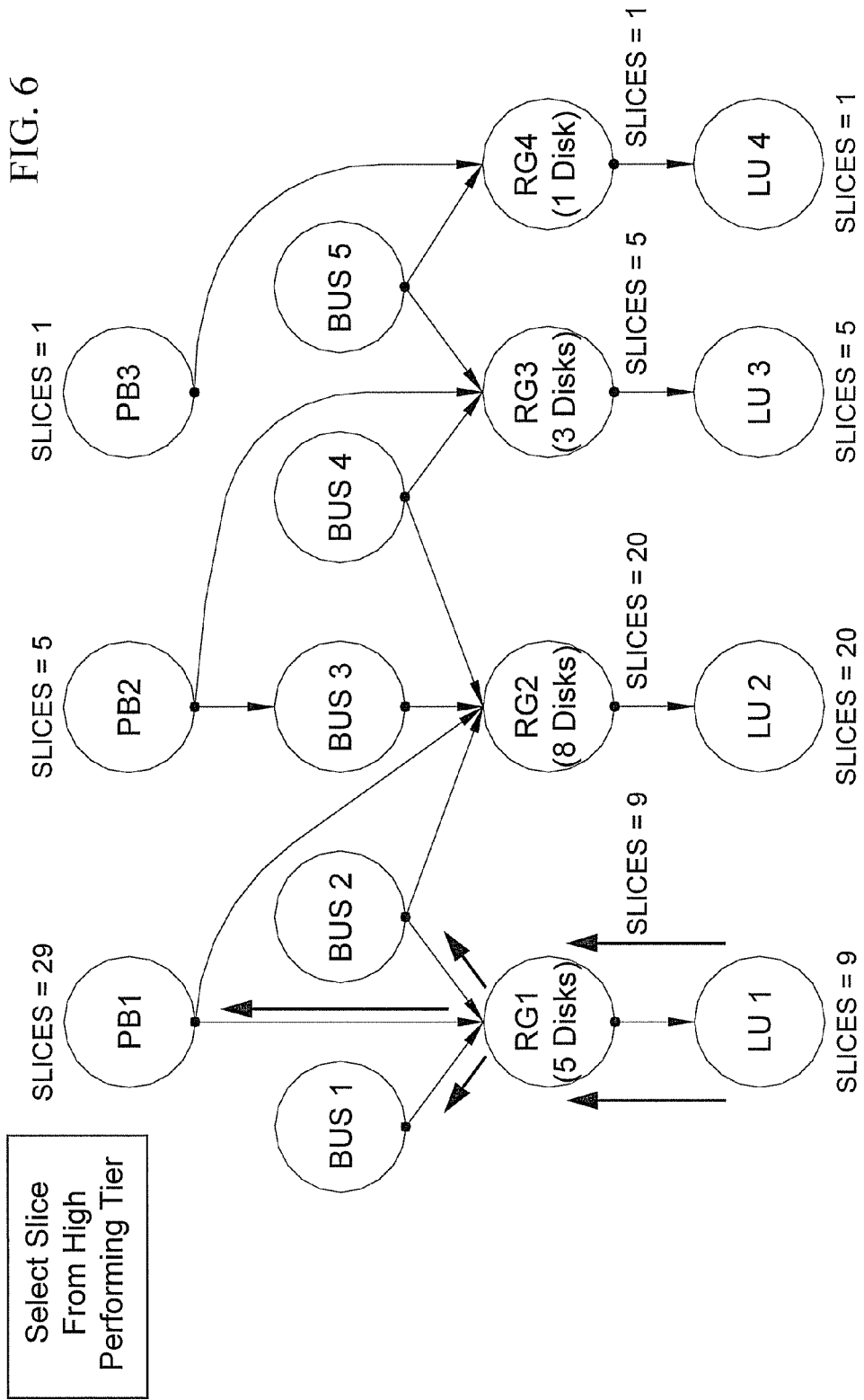
FIG. 6 is a diagram illustrating an exemplary process for updating statistics to the slice manager according to an embodiment of the subject matter described herein.

FIG. 6 is a diagram illustrating an exemplary process for updating statistics to the slice manager according to an embodiment of the subject matter described herein. Currently, it's a client's responsibility to track a slice that's selected but not committed and later commit that slice in case of SP failures after selecting a slice. There may be several types of resource objects: bus objects, RAID group objects, logical unit objects, and slice objects. In one embodiment, each resource object may include a header identifying the data structure as a generic resource manager (RM) object and slice statistics indicating how many total slices exist within that resource, how many of the total slices are allocated, etc. In alternative embodiments, slice statistics may be data stored within the resource object, a pointer to slice statistics stored elsewhere, or a function call to a slice statistics manager that provides this information, for example.

Statistics about the system resources represented in the collections may be maintained. In one embodiment, each resource object may include information pertinent to the selection process. In the embodiment illustrated in FIG. 6, performance bucket objects, bus objects, RAID group objects, and logical unit objects each maintain slice statistics. For example, bus objects may keep track of how many slices have been allocated from storage entities that are connected to each bus. Similarly, RAID group objects may keep track of the number of slices that it contains, the number of slices that have been allocated, the number of slices that are unallocated, and so on. In one embodiment, RAID group objects may keep track of the buses to which the RAID group has physically connected or logically associated. Logic unit objects may also include slice statistics.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one constraint;
determining whether the at least one constraint cannot be satisfied;
in response to determining that the at least one constraint can be satisfied, allocating a slice that honors the at least one constraint; and
in response to determining that the at least one constraint cannot be satisfied, not allocating a slice.

2. The method of claim 1 comprising:
determining whether the at least one constraint cannot be satisfied; and
in response to determining that the at least one constraint cannot be satisfied, allocating a slice that fails to satisfy the at least one constraint.

3. The method of claim 1 wherein the at least one constraint includes at least one of a performance bucket, a bus, a redundant array of inexpensive disks (RAID) group, and a logical unit (LU).

4. The method of claim 1 wherein the at least one constraint includes one of a tier value and a range of tier values.

5. The method of claim 1 wherein a slice is allocated from one of a logical unit (LU), a mapped LU (MLU), a fully-allocated LU (FLU), a direct LU (DLU), and a thin LU (TLU).

6. The method of claim 1 comprising tracking statistics associated with one or more slices.

7. The method of claim 6 wherein tracking statistics includes tracking one or more of: allocated slices, unallocated slices, reserved slices, unreserved slices, a number of unallocated reserved slices per tier-preference, and a number of slices that are allocated and not committed.

8. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint;
wherein the at least one resource group constraint includes a tier identified by a tier descriptor; and
wherein the tier includes one of a coarse tier and a fine tier.

9. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource croup includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein the slice allocation request includes a tier preference indicating one of a high, low, and no tier preference.

10. The method of claim 9 wherein, in response to a slice allocation request indicating a high performance tier preference, slices are allocated from a highest performance bucket.

11. The method of claim 9 wherein, in response to a slice allocation request indicating a low performance tier preference, slices are allocated from a lowest performance bucket.

12. The method of claim 9 wherein, in response to a slice allocation request indicating a no performance tier preference, slices are allocated from the resource pool using a splatter algorithm, wherein the splatter algorithm allocates slices evenly across each resource grouping.

13. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein the slice allocation request includes a requirement that a slice be allocated from a specific redundant array of inexpensive disks (RAID) group.

14. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein the slice allocation request indicates a preference for a particular storage processor (SP).

15. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint;
determining whether there exists a single policy for each resource type; and
in response to determining that a single policy exists for each resource type, combining two or more LU-specific policies.

16. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein the slice allocation request requests a new slice as one of an initial allocation and as a destination slice for a data relocation operation.

17. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and deriving a number of performance buckets, wherein deriving the number of performance buckets includes:
obtaining a tier ID from a tier descriptor included in the slice allocation request; and
applying a bitmask to the tier ID that indicates a number of most significant bits of the tier ID to use to create performance tiers, wherein the number of performance buckets includes 2 to the power of the number of most significant bits.

18. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein allocating a slice from a specific performance tier includes dynamically determining an order for evaluating whether a resource collection at each level in a hierarchy satisfies the at least one resource group constraint.

19. A method for tier-based slice allocation and data relocation in a data storage array, the method comprising:
at the data storage array including physical data storage, wherein the physical data storage is logically divided into one or more logical units (LUs), wherein each of the one or more LUs are further subdivided into one or more slices, wherein the data storage array includes a resource pool being divided into a plurality of resource groups, wherein each resource group includes one or more resources of a shared resource type:
receiving a slice allocation request for allocating a slice from the data storage array, wherein the slice allocation request includes at least one resource group constraint;
in response to receiving the slice allocation request, allocating a slice that honors the at least one resource group constraint; and
wherein at least one resource is included in multiple performance buckets.

20. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint
determine whether the at least one constraint cannot be satisfied; and
in response to determining that the at least one constraint cannot be satisfied, not allocate a slice.

21. The system of claim 20 wherein the slice manager is configured to:
determine whether the at least one constraint cannot be satisfied; and
in response to determining that the at least one constraint cannot be satisfied, allocate a slice that fails to satisfy the at least one constraint.

22. The system of claim 20 wherein the at least one constraint includes at least one of a performance bucket, a bus, a redundant array of inexpensive disks (RAID) group, and a logical unit (LU).

23. The system of claim 20 wherein the at least one constraint includes one of a tier value and a range of tier values.

24. The system of claim 20 wherein the at least one constraint includes a tier identified by a tier descriptor.

25. The system of claim 20 wherein the slice manager is configured to allocate a slice from one of a logical unit (LU), a mapped LU (MLU), a fully-allocated LU (FLU), a direct LU (DLU), and a thin LU (TLU).

26. The system of claim 20 wherein the slice allocation request requests a new slice as one of an initial allocation and as a destination slice for a data relocation operation.

27. The system of claim 20 wherein the slice manager is configured to track statistics associated with one or more slices.

28. The system of claim 27 wherein the slice manager is configured to track one or more of: allocated slices, unallocated slices, reserved slices, unreserved slices, a number of unallocated reserved slices per tier-preference, and a number of slices that are allocated and not committed.

29. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice manager is configured to:
determine whether the at least one constraint cannot be satisfied; and
in response to determining that the at least one constraint cannot be satisfied, allocate a slice that fails satisfy the at least one constraint.

30. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;

a slice manager configured to:
receive a slice allocation request for allocating a slice from the data storage array, wherein the slice allocation request include at least one constraint;
in response to receiving the slice allocation request, allocating a slice that honors the at least one resource group constraint;
wherein the at least one constraint includes a tier identified by a tier descriptor; and
wherein the tier includes one of a coarse tier and a fine tier.

31. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice allocation request includes a tier preference indicating one of a high, low, and no tier preference.

32. The system of claim 31 wherein, in response to a slice allocation request indicating a high performance tier preference, the slice manager is configured to allocate slices from a highest performance bucket.

33. The system of claim 31 wherein, in response to a slice allocation request indicating a low performance tier preference, the slice manager is configured to allocate slices from a lowest performance bucket.

34. The system of claim 31 wherein, in response to a slice allocation request indicating a no performance tier preference, the slice manager is configured to allocate slices from the resource pool using a splatter algorithm, wherein the splatter algorithm allocates slices evenly across each resource grouping.

35. A system for tier-based slice allocation and data relocation in a data storage array, the system comprising:
the data storage array including physical data storage capacity being, logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice allocation request includes a requirement that a slice be allocated from a specific redundant array of inexpensive disks (RAID) group.

36. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice allocation request indicates a preference for a particular storage processor (SP).

37. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice manager is configured to:
determine whether there exists a single policy for each resource type; and
in response to determining that a single policy exists for each resource type, combine two or more LU-specific policies.

38. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;
a slice manager configured to:
receive a slice allocation request for allocating a slice from the data storage array, wherein the slice allocation request include at least one constraint;
in response to receiving the slice allocation request, allocating a slice that honors the at least one constraint; and
wherein the slice manager is configured to derive a number of performance buckets, wherein deriving the number of performance buckets includes:
obtaining a tier ID from a tier descriptor included in the slice allocation request; and
applying a bitmask to the tier ID that indicates a number of most significant bits of the tier ID to use to create performance tiers, wherein the number of performance buckets includes 2 to the power of the number of most significant bits.

39. A system for tier-based slice allocation and data relocation in a data storage array, the system comprising:
the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;

a slice manager configured to:
   receive a slice allocation request for allocating a slice from the data storage array, wherein the slice allocation request include at least one constraint;
   in response to receiving the slice allocation request, allocating a slice that honors the at least one constraint; and
   wherein the slice manager is configured to allocate a slice from a specific performance tier by dynamically determining an order for evaluating whether a resource collection at each level in hierarchy satisfies the at least one constraint.

40. A system for tier-based slice allocation and data relocation in a data storage array, the system comprising:

the data storage array including physical data storage capacity being logically divided into one or more logical units (LUs), wherein each of the one or more LUs are further subdivided into one or more slices, wherein the data storage array includes a resource pool that is divided into a plurality of resource groupings, where each resource grouping includes one or more resources of a common type;

a slice manager configured to:
   receive a slice allocation request for allocating a slice from the data storage array, wherein the slice allocation request include at least one constraint;
   in response to receiving the slice allocation request, allocating a slice that honors the at least one constraint; and
   wherein at least one resource is included in multiple performance buckets.

41. A non-transitory computer readable medium having stored thereon computer executable instructions that when executed by a processor of a computer perform steps comprising:

at a data storage array including physical data storage capacity being logically divided into one or more logical units (LUs) and each of the one or more LUs being further subdivided into one or more slices, where the data storage array includes a resource pool being divided into a plurality of resource groupings, where each resource grouping includes one or more resources of a common type:
   receiving a slice allocation request for allocating a slice from the data storage array, wherein the slice allocation request include at least one constraint;
   determining whether the at least one constraint cannot be satisfied;
   in response to determining that the at least one constraint can be satisfied, allocating a slice that honors the at least one resource group constraint; and
   in response to determining that the at least one constraint cannot be satisfied, not allocating a slice.

* * * * *